Sept. 6, 1960     F. K. HELLE ET AL     2,951,773
METHOD OF COATING ELECTRICAL DISCHARGE TUBES
Filed Feb. 7, 1956
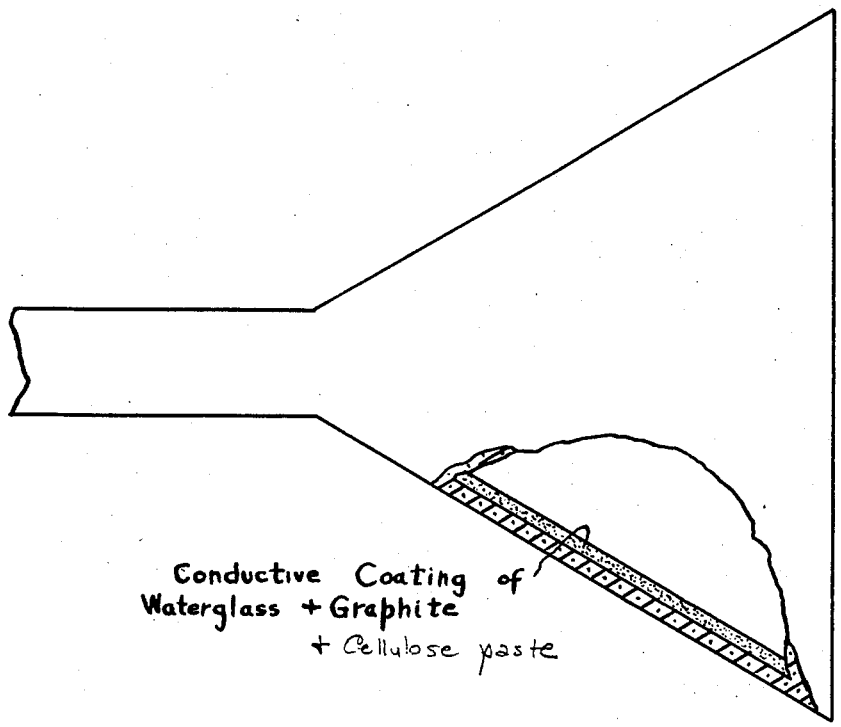
INVENTORS
Fritz Kurt Helle
Günther Johannes Theodor Rosenfeldt
BY
AGENT

United States Patent Office 2,951,773
Patented Sept. 6, 1960

2,951,773
METHOD OF COATING ELECTRICAL DISCHARGE TUBES

Fritz Kurt Helle, Hamburg-Fuhlsbuttel, and Günther Johannes Theodor Rosenfeldt, Hamburg, Germany, assignors, by mesne assignments, to North American Philips Company, Inc., New York, N.Y., a corporation of Delaware Filed Feb. 7, 1956, Ser. No. 564,042

Claims priority, application Germany Feb. 12, 1955

2 Claims. (Cl. 117—211)

It is known with electric discharge tubes to provide the tube wall, which is generally made of glass, with a conductive coating of mixtures of potassium water-glass and graphite. When using commercially obtainable potassium water-glass with a molecular ratio of 1:2.5–1:3.6 ($K_2O:SiO_2$), difficulties arise, however, in practice, since such coatings may give rise etching of the glass substratum, and/or sweating, which may be due to the formation of carbonates.

An electric discharge tube, for example, a cathode-ray tube according to the invention contains a conductive wall coating mainly consisting of a mixture of waterglass and graphite, in which the waterglass, for example potassium water-glass, has a molecular ratio of the alkaline oxide to the silicon dioxide between 1:5 and 1:7.

The indicated molecular ratio in the waterglass employed provides the advantage that no after-treatment is required and the coating adheres adequately to the walls. Nevertheless such layers can be washed off completely with water within a few minutes, so that during the manufacture any repair of the coating applied can be readily carried out. Moreover, the layers have satisfactory conductivity.

The desired molecular ratio may be obtained preferably by adding a solution of colloidal silicic acid in an aqueous suspension, for example the commercially available "Aerosil."

It has been found to be efficient to add to the substance of the coating an organic swelling agent, so that particularly elastic tough coatings may be obtained. As organic swelling agents may be used all organic, water-soluble colloids which are smooth and elastic in their dry state. Such substances are commercially obtainable under the names of "Sichozell," a soluble cellulose paste in the form of extremely thin flakes, "Traganth," an imbibition product of "Traganth," "Glutolin," a water soluble cellulose, and the like.

According to the invention, an electric discharge tube, for example a television tube, may be provided for example with an external coating of the following composition:

70–80% of water
0.5–1.5% of $K_2O$
2–6% of $SiO_2$
1–2% of Sichozell (Cellulose paste)
15–20% of graphite The material for the coatings according to the invention may be applied by spraying it uniformly on the slightly preheated tube wall. The temperature of the tube wall must be about 50 to 80° C.

The drawing illustrates an electric discharge tube with a portion of the tube broken away to show the internal conductive coating of waterglass and graphite.

What is claimed is:

1. A method of applying a conductive coating to the wall of an electric discharge tube, comprising forming a suspension of graphite and an alkali metal silicate with a molecular ratio of alkaline oxide to silicon dioxide between 1:5 and 1:7 and spraying said suspension on the tube wall which is preheated to 50 to 80° C.

2. A method of applying a conductive coating to the wall of an electric discharge tube, comprising forming a suspension in 70%–80% by weight of water of graphite and 15%–20% by weight of potassium silicate in which the molecular ratio of the potassium oxide to the silicon dioxide lies between 1:5 and 1:7 and spraying said suspension on the tube wall which is preheated to 50° C. to 80° C.

References Cited in the file of this patent
UNITED STATES PATENTS

| | | |
|---|---|---|
| 1,518,807 | Minter | Dec. 9, 1924 |
| 2,264,892 | V. J. Schaefer | Dec. 2, 1941 |
| 2,661,438 | Shand | Dec. 1, 1953 |
| 2,689,804 | Sadowskg | Sept. 21, 1954 |
| 2,706,691 | Schaefer | Apr. 19, 1955 |
| 2,709,414 | Powell | May 31, 1955 |
| 2,803,566 | Smith-Johannsen | Aug. 20, 1957 |